US012735081B2

(12) United States Patent
Choudhary et al.

(10) Patent No.: US 12,735,081 B2
(45) Date of Patent: Sep. 15, 2026

(54) SYSTEM AND METHOD FOR MANAGING AUTONOMOUS ROBOTS USING AN AUTONOMOUS ROBOT LOCALIZATION SYSTEM

(71) Applicant: FLEXLI TECHNOLOGIES PRIVATE LIMITED, Bengaluru (IN)

(72) Inventors: Raja Choudhary, Bhagalpur (IN); Shrikant Anil Bhole, Jalgaon (IN); Anuj Agrawal, Kanpur (IN)

(73) Assignee: Flexli Technologies Private Limited, Bengaluru (IN)

( * ) Notice: Subject to any disclaimer, the term of this patent is extended or adjusted under 35 U.S.C. 154(b) by 38 days.

(21) Appl. No.: 19/110,161

(22) PCT Filed: Sep. 4, 2023

(86) PCT No.: PCT/IN2023/050833
§ 371 (c)(1),
(2) Date: Mar. 10, 2025

(87) PCT Pub. No.: WO2024/052930
PCT Pub. Date: Mar. 14, 2024

(65) Prior Publication Data

US 2026/0077791 A1 Mar. 19, 2026

(30) Foreign Application Priority Data

Sep. 8, 2022 (IN) ............................. 202241051452

(51) Int. Cl.
*B61L 25/02* (2006.01)
*B61L 27/16* (2022.01)
(Continued)

(52) U.S. Cl.
CPC ............. *B61L 25/025* (2013.01); *B61L 27/16* (2022.01); *G05B 19/4155* (2013.01); *G05D 1/69* (2024.01); *G05B 2219/40252* (2013.01)

(58) Field of Classification Search
CPC ... B61L 25/025; B61L 27/16; G05B 19/4155; G05B 2219/40252; G05B 19/042;
(Continued)

(56) References Cited

U.S. PATENT DOCUMENTS 3,198,352 A 8/1965 Puechberty
8,554,643 B2 10/2013 Kortelainen
(Continued)

*Primary Examiner* — Yi-Kai Wang
(74) *Attorney, Agent, or Firm* — Jason C. Cameron

(57) ABSTRACT

An autonomous robot localization system for managing a plurality of autonomous robots is disclosed. The autonomous robot localization system includes a plurality of rail paths including a plurality of markers, a plurality of autonomous robots, and a system controller. The plurality of rail paths is used for guiding the plurality of autonomous robots. The plurality of autonomous robots include a plurality of readers, and a plurality of robot controllers. The plurality of readers include a plurality of sensors The plurality of robot controllers generate a plurality of marker patterns for corresponding marker based on assigned presence and absence status of the plurality of marker bits. The system controller manages movements of the plurality of autonomous robots based on a plurality of commands sent to the plurality of robot controllers.

23 Claims, 11 Drawing Sheets

(51) Int. Cl.
*G05B 19/4155* (2006.01)
*G05D 1/69* (2024.01)

(58) Field of Classification Search
CPC ........ G05D 1/69; G05D 1/2446; G05D 1/225; G05D 1/693; G05D 1/6987; G05D 2105/28; G05D 2107/70; G05D 2109/10
USPC .......................................................... 701/19
See application file for complete search history.

(56) References Cited

U.S. PATENT DOCUMENTS

| | | | | |
|---|---|---|---|---|
| 9,122,566 | B2 | 9/2015 | Bastian, II et al. | |
| 9,617,075 | B2 | 4/2017 | Porat | |
| 11,332,310 | B2 | 5/2022 | Lert, Jr. | |
| 2020/0103917 | A1* | 4/2020 | Murphy | G01C 21/206 |
| 2021/0387812 | A1 | 12/2021 | Li et al. | |
| 2025/0328143 | A1* | 10/2025 | Liang | G05D 1/246 |
| 2026/0029792 | A1* | 1/2026 | Kitano | G05D 1/2446 |

* cited by examiner

SYSTEM AND METHOD FOR MANAGING AUTONOMOUS ROBOTS USING AN AUTONOMOUS ROBOT LOCALIZATION SYSTEM

EARLIEST PRIORITY DATE

This Application claims priority from a patent application filed in India having Patent Application No. 202241051452, filed on Sep. 8, 2022, and titled SYSTEM AND METHOD FOR MANAGING AUTONOMOUS ROBOTS USING AN AUTONOMOUS ROBOT LOCALIZATION SYSTEM".

FIELD OF INVENTION

Embodiments of the present invention relate to robots in an industrial setup, more particularly relate to a system and method for managing autonomous robots carrying a plurality of articles in the industrial setup using an autonomous robot localization system.

BACKGROUND

Generally, warehouses and factories require articles to be transferred from one location to another in order to complete a task. A manual labour is typically required for this activity. With the rising shortage and increasing cost of manpower, autonomous robots or autonomous vehicles (collectively referred as autonomous robots) are being used increasingly as a substitute for a manual labour. Some of the existing autonomous robots systems include Overhead Hoist Transfer (OHT) that is primarily used in a semiconductor manufacturing and mobile robots that are used in warehouses for order-fulfilment and sortation.

The autonomous robots require a localization system for its navigation from one location to another in an automated manner. The localization system generally helps to identify a current position of the autonomous robots, based on which a subsequent movement can be planned. Generally, the localization system requires a reader and marker systems that help the autonomous robots to identify its current position.

Some of the existing reader-marker systems include radio frequency identification (RFID Reader)-radio frequency identification tags (RFID Tags), wherein the RFID tags are affixed on static locations and the RFID reader is located inside the autonomous robot. Yet another reader-marker system includes a quick response code (QR code) or barcode—code scanner, wherein the QR code/barcode is affixed on static path locations and the code scanner is positioned within the autonomous robot in a manner that the code scanner (i.e., a reader) scans the QR code/barcode (i.e., a marker) when it passes through the same.

Generally, the reader-marker system's efficacy depends on a relative speed between the reader-marker when the reader is reading the marker. As this relative speed increases the performance of the reader-system goes down significantly. Maintaining required efficacy at higher speeds require fast reader-markers, which is significantly higher in cost and in turn significantly increase the cost of the overall system. Despite the presence of autonomous robots, a good portion of articles movements within a factory and warehouse happens manually.

Hence, there is a need for a system and method for managing an autonomous robot in an industrial setup, to address the aforementioned problems thereof.

SUMMARY

In accordance with one embodiment of the disclosure, an autonomous robot localization system for managing a plurality of autonomous robots in an industrial setup is disclosed. The autonomous robot localization system includes a plurality of rail paths including a plurality of markers, a plurality of autonomous robots, and a system controller. The plurality of rail paths is used for guiding the plurality of autonomous robots on the plurality of rail paths. The plurality of rail paths include the plurality of markers for identifying a current position of the plurality of autonomous robots. The plurality of markers include a plurality of marker bits that are arranged in a plurality of patterns.

The plurality of autonomous robots carries a plurality of articles. The plurality of autonomous robots include a plurality of readers for communicatively connected to the plurality of markers on the plurality of rail paths. The plurality of readers include a plurality of sensors configured to detect at least one of: presence and absence of the plurality of marker bits. The plurality of autonomous robots include a plurality of robot controllers that is communicatively connected to the plurality of readers. The plurality of readers receive a plurality of signals from the plurality of sensors. The plurality of signals are generated by the plurality of sensors while passing through the plurality of marker bits. The plurality of sensors in a sensor array are proportional to the maximum number of plurality of marker bits in a plurality of marker bits array of plurality of markers.

The plurality of robot controllers (a) analyze at least one of: the presence and absence the plurality of marker bits in the plurality of markers, (b) assign at least one of: a presence and absence status to each of the plurality of marker bits based on the at least one of: analyzed presence and absence of the plurality of marker bits, and (c) generate a plurality of marker patterns for the corresponding marker based on the assigned presence and absence status of each of the plurality of marker bits.

The system controller (a) receives the plurality of marker patterns generated by the plurality of the robot controllers, (b) determine the current position of the plurality of autonomous robots based on the received plurality of marker patterns, (c) generate a plurality of commands to the plurality of autonomous robots based on the determined current position of the plurality of autonomous robots, and (d) manage movements of the plurality of autonomous robots at real time based on the generated plurality of commands sent to the plurality of robot controllers. In an embodiment, the current position of the plurality of autonomous robots are determined by mapping, the generated plurality of marker patterns with a corresponding plurality of location identifiers (ID) pre-stored in a database.

In one aspect, an autonomous robot localization method for managing a plurality of autonomous robots in an industrial setup using an autonomous robot localization system is disclosed. The autonomous robot localization method includes following steps of: (a) receiving, using a plurality of robot controllers, a plurality of signals from a plurality of readers; (b) analyzing, using the plurality of robot controllers, at least one of: presence and absence of a plurality of marker bits in a plurality of markers; (c) assigning, using the plurality of robot controllers, at least one of: a presence and absence status to each of the plurality of marker bits based on the at least one of: analyzed presence and absence of the plurality of marker bits; (d) generating, using the plurality of robot controllers, a plurality of marker patterns for a corresponding marker based on the assigned presence and absence status of each of the plurality of marker bits; (e) receiving, using a system controller, the plurality of marker patterns generated by the plurality of the robot controllers; (f) determining, using the system controller, a current position of the plurality of autonomous robots based on the received plurality of marker patterns; (g) generating, using the system controller, a plurality of commands to the plurality of autonomous robots based on the determined current position of the plurality of autonomous robots; and (h) managing, using the system controller, movements of the plurality of autonomous robots at real time based on the generated plurality of commands sent to the plurality of robot controllers.

In an embodiment, the plurality of readers include the plurality of sensors configured to detect at least one of: the presence and absence of a plurality of marker bits of the plurality of markers. In another embodiment, the plurality of signals are generated by the plurality of sensors while passing through the plurality of marker bits. In yet another embodiment, the plurality of sensors in a sensor array are proportional to the maximum number of marker bits in marker bits array of plurality of markers.

In yet another embodiment, the current position of the plurality of autonomous robots are determined by mapping the generated plurality of marker patterns with a corresponding plurality of location identifiers (ID) pre-stored in a database.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
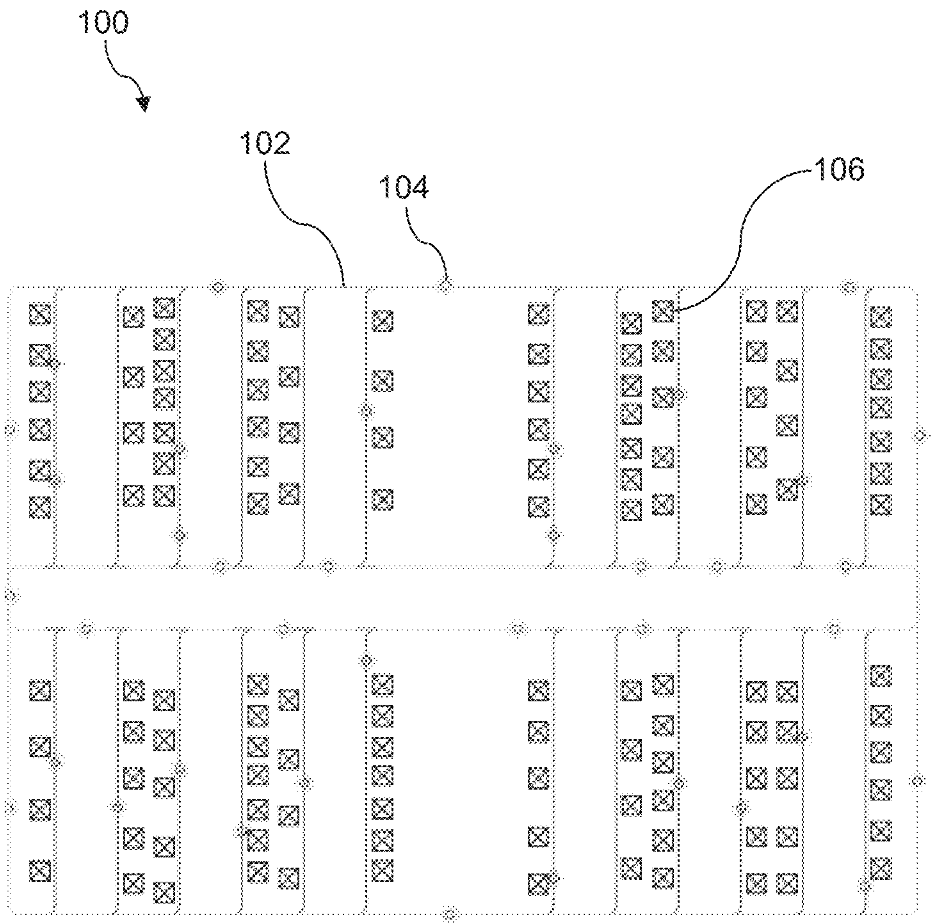
FIG. 1 is a schematic representation of an autonomous robot localization system including a plurality of rail paths for guiding a plurality of autonomous robots, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms “comprises”, “comprising”, or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by “comprises . . . a” does not, without more constraints, preclude the existence of other devices, subsystems, elements, structures, components, additional devices, additional subsystems, additional elements, additional structures or additional components. Appearances of the phrase “in an embodiment”, “in another embodiment” and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms “a”, “an”, and “the” include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

FIG. 1 is a schematic representation of an autonomous robot localization system 100 including a plurality of rail paths 102 for guiding a plurality of autonomous robots 104, in accordance with an embodiment of the present disclosure. The autonomous robot localization system 100 in an industrial setup includes the plurality of rails paths 102, the plurality of autonomous robots 104, and a plurality of stations 106. The plurality of rail paths 102 are formed using a plurality of overhead rails. In an embodiment, the industrial setup is a warehouse, a factory, an industry, a manufacture and storage area, and the like.

The plurality of rail paths 102 are used to guide the plurality of autonomous robots 104 on the plurality of rail paths 102. The plurality of autonomous robots 104 carry a plurality of articles on the plurality of rail paths 102. In an embodiment, the plurality of articles are automatically carried by the plurality of autonomous robots 104. In another embodiment, the plurality of articles are manually loaded on the plurality of autonomous robots 104. In an embodiment, the plurality of articles are at least one of: a plurality of intermediate parts, finished products, a plurality of packets, and the like to be delivered. The plurality of stations 106 are arranged in the plurality of rail paths 102, which include a plurality of markers for identifying a current position of the plurality of autonomous robots 104. In an embodiment, the plurality of markers are arranged at a junction of the plurality of rail paths 102 so that the plurality of autonomous robots 104 are informed whether the plurality of autonomous robots 104 need to be moved to a next station or wait at the same station based on a traffic among the plurality of robots 104. In an embodiment, the plurality of markers include a plurality of marker bits that are arranged in a plurality of patterns. In an embodiment, the autonomous robot localization system 100 further includes movement direction, in which the plurality of autonomous robots 104 are passed to deliver the plurality of articles in a plurality of destination stations based on a plurality of commands received from a system controller.

In an embodiment, the plurality of rail paths 102 include a plurality of increment markers and a plurality of station markers (i.e., the plurality of markers). Using the plurality of increment markers, the plurality of autonomous robots 104 determine their relative movements with respect to a previous marker. In another embodiment, the plurality of autonomous robots 104 obtain information related to an absolute position using the plurality of station markers. In an embodiment, the plurality of station markers are arranged in each junction of the plurality of rail paths 102.

Figure 2:
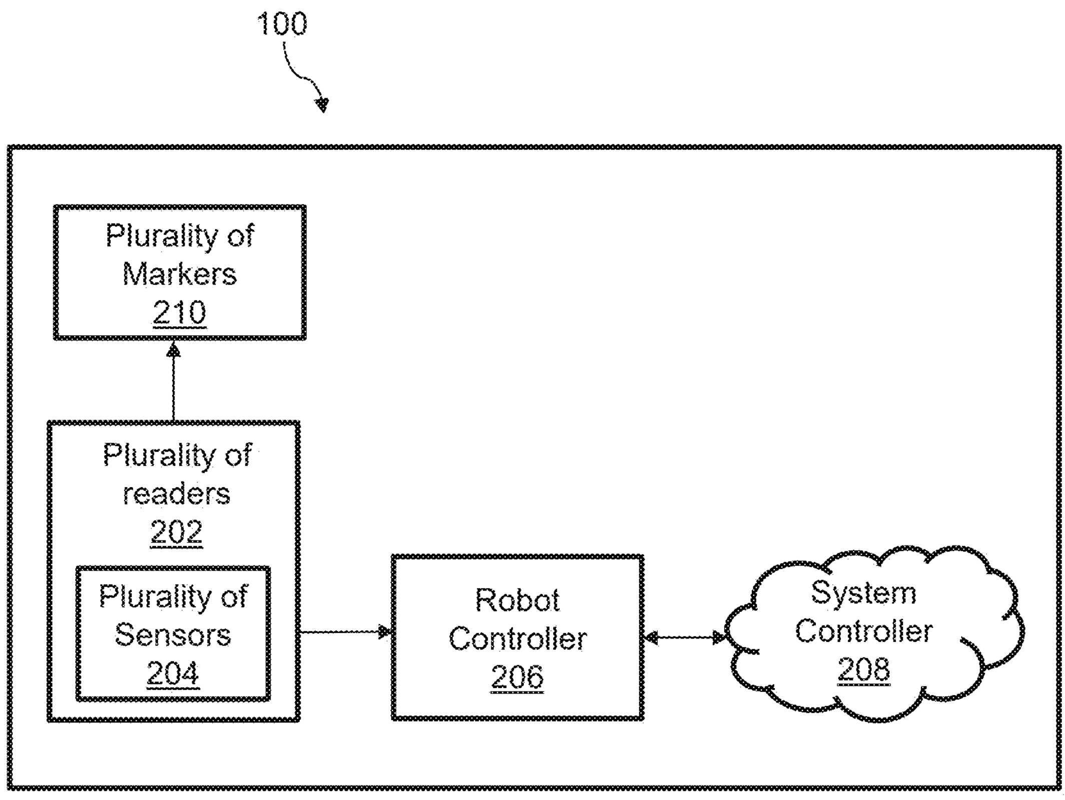
FIG. 2 is a block diagram of the autonomous robot localization system for managing the plurality of autonomous robots, such as those shown in FIG. 1, in accordance with an embodiment of the present disclosure.

FIG. 2 is a block diagram of the autonomous robot localization system 100 for managing the plurality of autonomous robots 104, such as those shown in FIG. 1, in accordance with an embodiment of the present disclosure. The block diagram of the autonomous robot localization system 100 includes the plurality of autonomous robots 104, a system controller 208, and a plurality of markers 210. The plurality of autonomous robots 104 include a plurality of readers 202 that include a plurality of sensors 204, and a plurality of robot controllers 206. In an embodiment, the plurality of robot controllers 206 are arranged at outside of the plurality of autonomous robots 104.

The plurality of readers 202 that are communicatively connected to the plurality of markers 210 arranged on the plurality of rail paths 102. The plurality of readers 202 include the plurality of sensors 204 that are configured to detect at least one of: presence and absence of the plurality of marker bits. The plurality of robot controllers 206 are communicatively connected to the plurality of readers 202.

The plurality of robot controllers 206 analyze at least one of: the presence and absence of the plurality of marker bits in the plurality of markers 210. The plurality of robot controllers 206 further assign at least one of: a presence and absence status to each of the plurality of marker bits based on the at least one of: analyzed presence and absence of the plurality of marker bits.

The plurality of robot controllers 206 assign the presence and absence status to each of the plurality of marker bits by (a) obtaining at least one of: voltage values and current values from the plurality of sensors 204 upon scanning each of the plurality of marker bits, (b) determining a difference between the at least one of: the voltage values and the current values as a result of change of light intensity due to opacity pattern of the plurality of markers 210, and (c) assigning at least one of: the presence and absence status for each of the plurality of marker bits based on the at least one of: voltage difference and current difference of the plurality of sensors 204. The plurality of robot controllers 206 generate a plurality of marker patterns for the corresponding marker based on presence and absence status of each of the plurality of marker bits.

The system controller 208 is communicatively connected to the plurality of robot controllers 206 of the plurality of autonomous robots 104. The system controller 208 is configured to control the plurality of autonomous robots 104. The system controller 208 receives the plurality of marker patterns generated by the plurality of the robot controllers 206. Further, the system controller 208 determines the current position of the plurality of autonomous robots 104 based on the generated plurality of marker patterns. In an embodiment, the current position of the plurality of autonomous robots 104 are determined by mapping the generated plurality of marker patterns with a corresponding plurality of location identifiers (ID) pre-stored in a database.

The system controller 208 further generates a plurality of commands to the plurality of autonomous robots 104 based on the determined current position of the plurality of autonomous robots 104 and a plurality of traffic conditions of the plurality of rail paths 102. The system controller 208 further manages movements of the plurality of autonomous robots 104 at real time based on the generated plurality of commands. In an embodiment, the system controller 208 manages the movements of the plurality of autonomous robots 104 by communicating the plurality of commands to the plurality of robot controllers 206 of the plurality of autonomous robots 104. In another embodiment, the system controller 208 acts as an external server, a cloud based server, and the like.

In an embodiment, the system controller 208 manages the movements of the plurality of autonomous robots 104 by (a) identifying the current position of the plurality of autonomous robots 104 based on the location ID, (b) determining a traffic among the plurality of autonomous robots 104 in the plurality of rail paths 102, and (c) managing the movements of the plurality of autonomous robots 104 based on a determined traffic in the plurality of rail paths 102. For example, an autonomous robot 104 is passing through the assigned rail path 102 and the autonomous robot 104 constantly sends the current position information to the system controller 208. The system controller 208 manages the autonomous robot 104 i.e., either commands the autonomous robot 104 to continue moving or stop the autonomous robot 104 in order to avoid collision among the plurality of autonomous robots 104.

In another example, when the destination station is an upcoming station ID, the system controller 208 informs the plurality of autonomous robots 104 at a station before the next station to deliver the article upon scanning the marker at the next station. The plurality of robot controllers 206 sends information on transferring of the articles to the plurality of destination stations, to the system controller 208 when the article is transferred into the plurality of destination stations. When the plurality of autonomous robots 104 carry the plurality of articles, the plurality of autonomous robots 104 (a) moves to the next destination station, and (b) receives the plurality of commands from the system controller 208 for assigning at least one of the plurality of stations 106 to the plurality of autonomous robots 104 for its next assignment.

Figure 3:
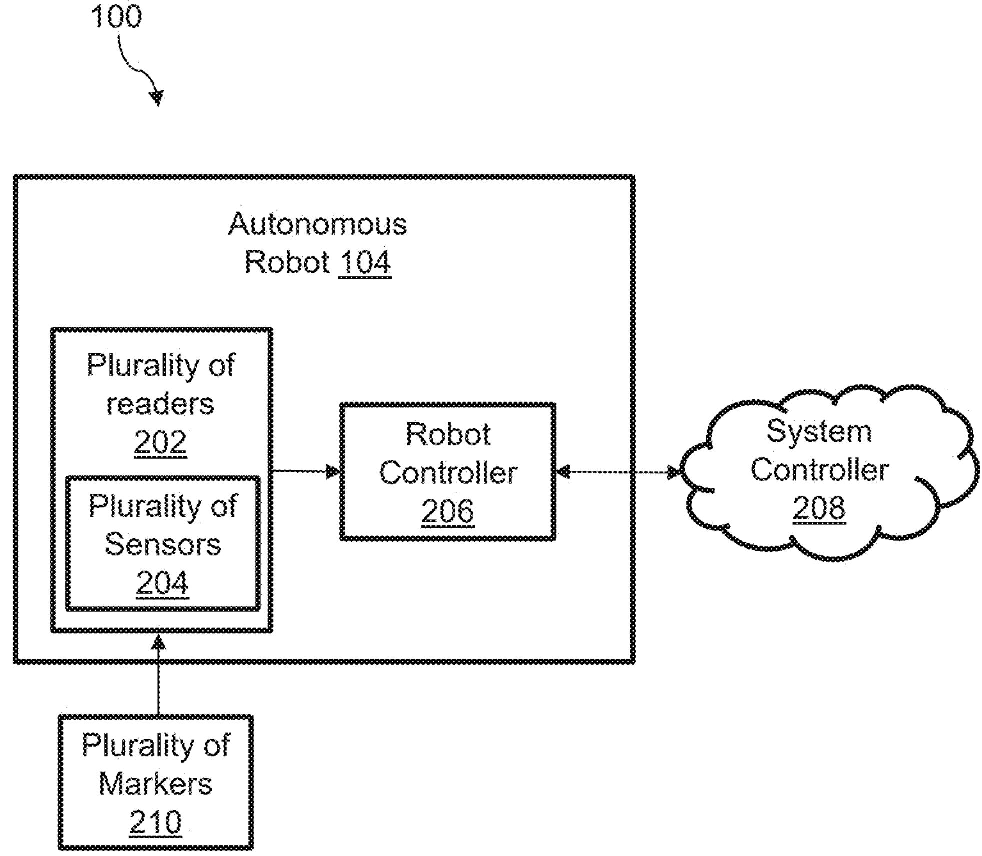
FIG. 3 is a block diagram of the autonomous robot localization system connected to a system controller, such as those shown in FIG. 2, in accordance with an embodiment of the present disclosure.

FIG. 3 is a block diagram of the autonomous robot localization system 100 connected to the system controller 208, such as those shown in FIG. 2, in accordance with an embodiment of the present disclosure. The plurality of autonomous robots 104 include the plurality of readers 202, the plurality of robot controllers 206, the system controller 208, and the plurality of markers 210. The plurality of readers 202 include a plurality of sensors 204 that are communicatively connected to the plurality of markers 210.

Figure 4:
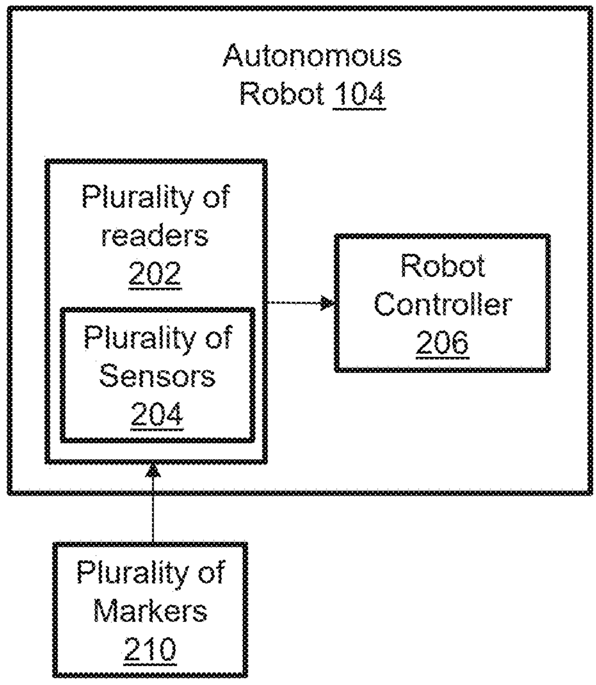
FIG. 4 is an exploded view of the plurality of autonomous robots, such as those shown in FIG. 3, in accordance with an embodiment of the present disclosure.

FIG. 4 is an exploded view of the plurality of autonomous robots 104, such as those shown in FIG. 3, in accordance with an embodiment of the present disclosure. The plurality of autonomous robots 104 include the plurality of readers 202 with the plurality of sensors 204, and the plurality of robot controllers 206. In an embodiment, the plurality of sensors 204 and the plurality of robot controllers 206 are arranged within the plurality of autonomous robots 104. The plurality of robot controllers 206 receive the plurality of commands from the system controller 208 to manage the plurality of autonomous robots 104 on the plurality of rail paths 102.

Figure 5:
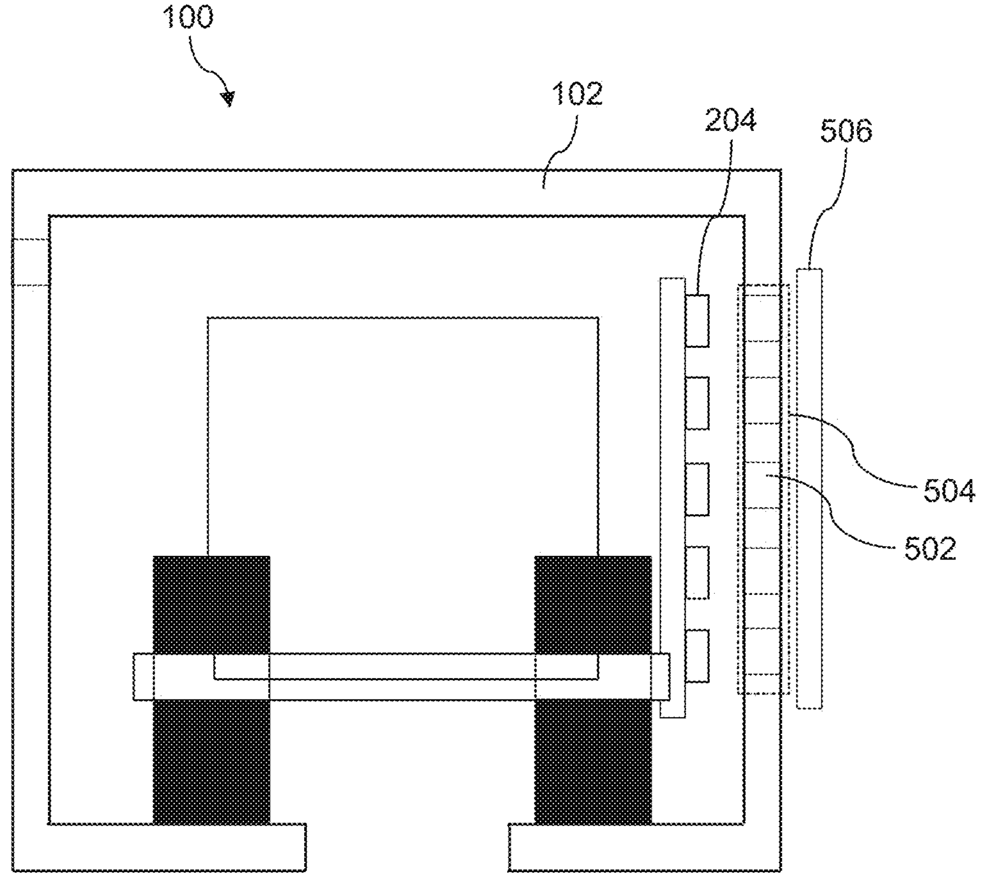
FIG. 5 is a cross sectional view of the autonomous robot localization system including the autonomous robot that are moved on a rail path, such as those shown in FIG. 2, in accordance with an embodiment of the present disclosure.

FIG. 5 is a cross sectional view of the autonomous robot localization system 100 including the autonomous robot 104 that are moved on the rail path 102, such as those shown in FIG. 2, in accordance with an embodiment of the present disclosure. The cross sectional view of the autonomous robot localization system 100 includes the autonomous robot 104 that is moving on the rail path 102. The plurality of markers 210 are arranged on the rail path 102. In an embodiment, the plurality of markers 210 include a plurality of marker bits 502 that are grouped as a plurality of marker bits array 504 in each of the plurality of markers 210. In an embodiment, the plurality of marker bits 502 are made using the plurality of slots in the rail path 102. In an embodiment, the plurality of sensors 204 are moving and the plurality of markers 210 are static in the plurality of rail paths 102.

In an embodiment, the plurality of sensors 204 are grouped to form as a plurality of sensor array. In an embodiment, the autonomous robot localization system 100 includes a plurality of light emitting diodes (LEDs) 506 to further increase difference between dark and bright portions in the plurality of marker bits 502. In an embodiment, the slot and a continuous material are visible in a location of the plurality of marker bits 502.

In an embodiment, the plurality of sensors 204 include at least one of: light dependent resistors (LDR), capacitive sensors, inductive sensors, a hall sensor and a reed switch, that are connected to the plurality of robot controllers 206 of the plurality of autonomous robots 104. In another embodiment, the plurality of sensor 204 are built using an array of at least two sensors. In an embodiment, the plurality of marker bits 502 include light sources and opaque material with a plurality of slots in the plurality of rail paths 102. In another embodiment, the plurality of marker bits 502 are arranged as the plurality of slots in the plurality of rail paths 102. In yet another embodiment, the plurality of marker bits 502 are arranged as a plurality of magnets in the plurality of rail paths 102 when the plurality of sensors 204 are at least one of: the hall sensor and the reed switch.

Figure 6:
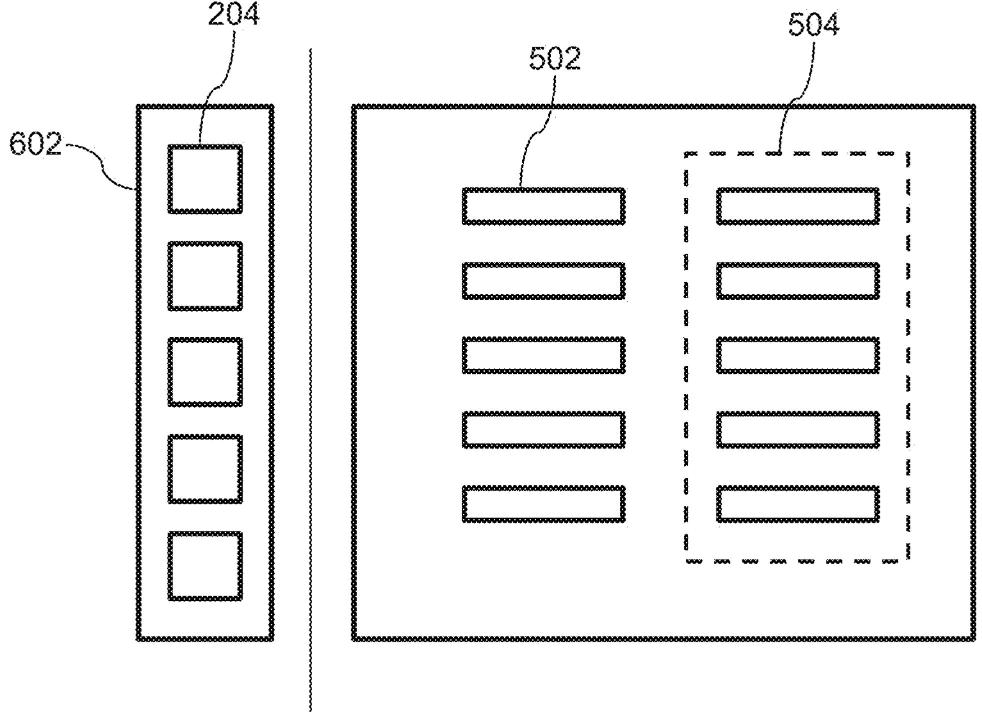
FIG. 6 is a schematic representation of an arrangement of a plurality of sensors and a plurality of marker bits, in accordance with an embodiment of the present disclosure.

FIG. 6 is a schematic representation of an arrangement of a plurality of sensors 204 and a plurality of marker bits 502, in accordance with an embodiment of the present disclosure. The plurality of sensors 204 are grouped as a plurality of sensor array 602. The plurality of marker bits 502 are grouped into the plurality of marker bits array 504 in each of the plurality of markers 210, as shown in FIG. 5. The plurality of sensors 204 receive the plurality of signals from the plurality of markers 210 while passing through the plurality of markers 210. In an embodiment, the plurality of markers 210 include the plurality of marker bits 502 that are arranged in a plurality of patterns. In an embodiment, the plurality of sensors 204 in the plurality of sensor array 602 are proportional to the maximum number of plurality of marker bits 502 in a marker bits array 504 in the plurality of markers 210. In an embodiment, the plurality of markers bits 502 are formed by at least one of: a material property including opacity, conductivity, capacitance, resistance, electric field, magnetic field.

In an embodiment, the plurality of robot controllers 206 differentiates the plurality of marker bits 502 with a binary value of 0 based on the plurality of slots in a bright portion when the bright portion including a light source without opaque portion is analyzed in the plurality of marker bits 502. In another embodiment, the plurality of robot controllers 206 differentiates the plurality of marker bits 502 with a binary value of 1 based on blocking of the plurality of slots in a dark portion when the dark portion including a light source with opaque portion is analyzed in the plurality of marker bits 502. Using the assigned binary values of 0 and 1 of each array of the plurality of marker bits array 504, the plurality of robot controllers 206 generate the plurality of marker patterns for the plurality of markers 210.

Further, the system controller 208 receives the generated plurality of marker patterns from the plurality of robot controllers 206 to determine the current position of the plurality of autonomous robots 104. In an embodiment, the current position of the plurality of autonomous robots 104 is determined by mapping the generated plurality of marker patterns with the corresponding plurality of location identifiers (ID) pre-stored in the database. In an embodiment, the plurality of sensors 204 are arranged within the plurality of autonomous robots 104 in a position that the plurality of sensors 204 appear in front of the plurality of marker bits 502 to scan the plurality of marker bits 502 when the plurality of sensors 204 pass through the plurality of markers 210.

The plurality of sensors 204 scans the plurality of markers 210 in an exposure time duration. In another embodiment, the exposure time duration of the plurality of sensors 204 is directly proportional to a length of the plurality of marker bits 502, and inverse of a processing power of the plurality of robot controllers 206. In an embodiment, when the plurality of autonomous robots 104 are moving at a speed of 1 meter per second (m/s), the required exposure time duration of the plurality of sensors 204 is at least one of: 0.01 seconds and higher than 0.01 seconds to scan the plurality of markers 210 correctly and reliably. In an embodiment, the plurality of robot controllers 206 of the plurality of the autonomous robots 104 includes a reading frequency. For example, the plurality of robot controllers 206 with the reading frequency of 500 Hz reads the marker bit array value of 10 times in the exposure time duration of 0.01 second. In an embodiment, when the plurality of autonomous robots 104 are moving at 2 m/s, and plurality of robot controllers 206 include the reading frequency of 500 Hz, the same level of reading accuracy is achieved by extending the marker bit length in the direction of movement by two times.

Figure 7:
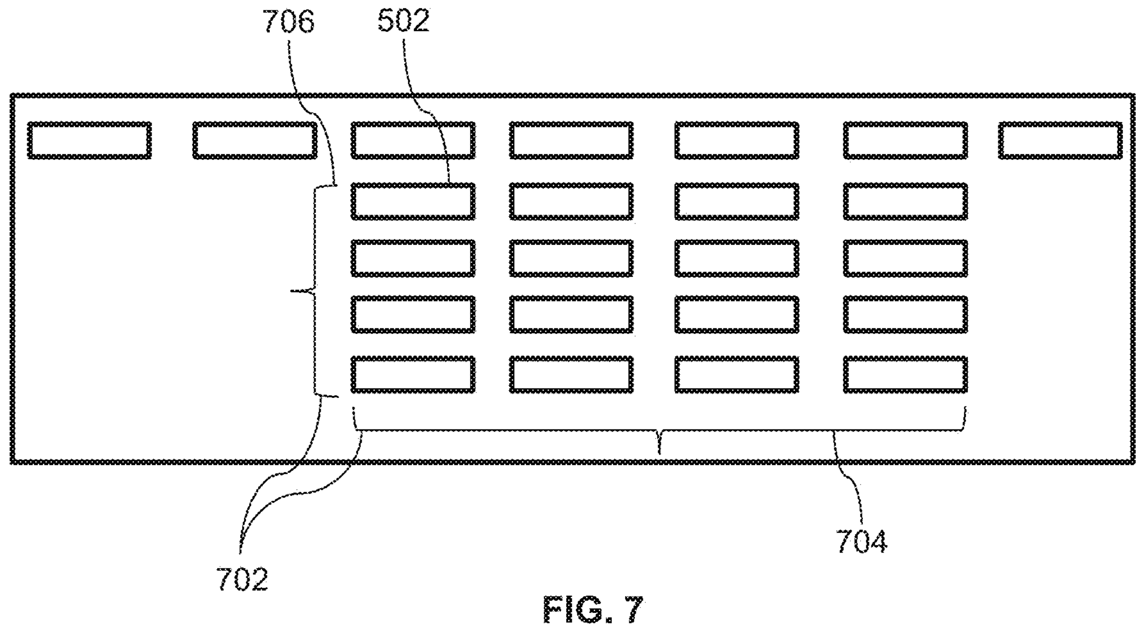
FIG. 7 is a side view of the rail path showing a plurality of marker bits, in accordance with an embodiment of the present disclosure.

FIG. 7 is a side view of the rail path 102 showing a plurality of marker bits 502, in accordance with an embodiment of the present disclosure. The side view of the rail path 102 shows that the plurality of markers 210 are grouped as M×N array 702 of the plurality of marker bits 502 in each of the plurality of markers 210. In embodiment, M is a row 704 of the plurality of marker bits 502 and N is a column 706 of the plurality of marker bits 502. For example, FIG. 7 shows the plurality of markers 210 that include the 4×4 (i.e., $2^{16}$) array of the plurality of marker bits 502 so that the plurality of robot controllers 206 generate 65,536 marker patterns for determining the current position of the plurality of autonomous robots 104.

In an embodiment, each row 704 includes M number of position for the plurality of marker bits 502 and each column 706 includes N number of positions for the plurality of marker bits 502, together including M*N numbers of a plurality of marker-bits positions. In another embodiment, each position indicate the at least one of: the presence and absence of a marker bit 502. In an embodiment, a plurality of slots arranged on the plurality of marker bits array 504 act as a reference slots and are not used for storing information.

Figure 8:
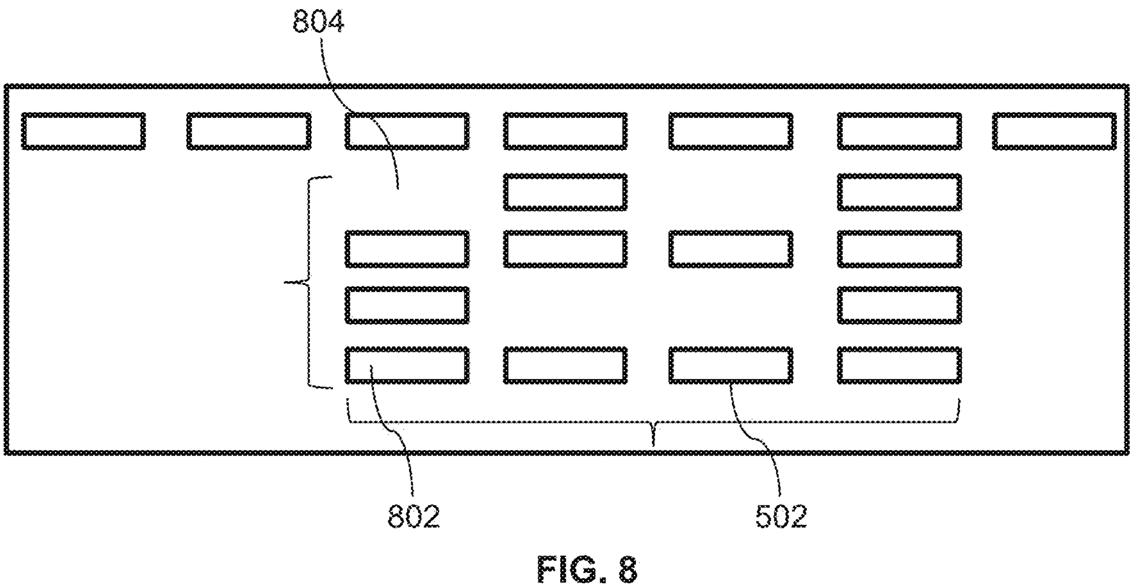
FIG. 8 is a side view of the rail path showing presence and absence of a plurality of marker bits in a plurality of markers, such as those shown in FIG. 7, in accordance with an embodiment of the present disclosure.

FIG. 8 is a side view of the rail path 102 showing presence 802 and absence 804 of the plurality of marker bits 502 in the plurality of markers 210, such as those shown in FIG. 7, in accordance with an embodiment of the present disclosure. The plurality of robot controllers 206 analyze at least one of: the presence 802 and absence 804 of the plurality of marker bits 502 in the plurality of markers 210. For example, the plurality of robot controllers 206 assign the presence status as 0 to at least one of a marker bit that is present when the plurality of sensors 204 scan the plurality of marker bits 502. In other words, the plurality of robot controllers 206 differentiate the plurality of marker bits 502 with a binary value of 0 based on the plurality of slots in a bright portion 802 (i.e., presence 802 of the plurality of marker bits 502) when the bright portion 802 including a light source without opaque portion is analyzed in the plurality of marker bits 502.

In another example, the plurality of robot controllers 206 assign the absence status as 1 to at least one of the marker bit that is absent when the plurality of sensors 204 scan the plurality of marker bits 502. In other words, the plurality of robot controllers 206 differentiate the plurality of marker bits 502 with a binary value of 1 based on blocking of the plurality of slots in a dark portion 804 (i.e., absence 804 of the plurality of marker bits 502) when the dark portion 804 including a light source with opaque portion is analyzed in the plurality of marker bits 502.

Figure 9:
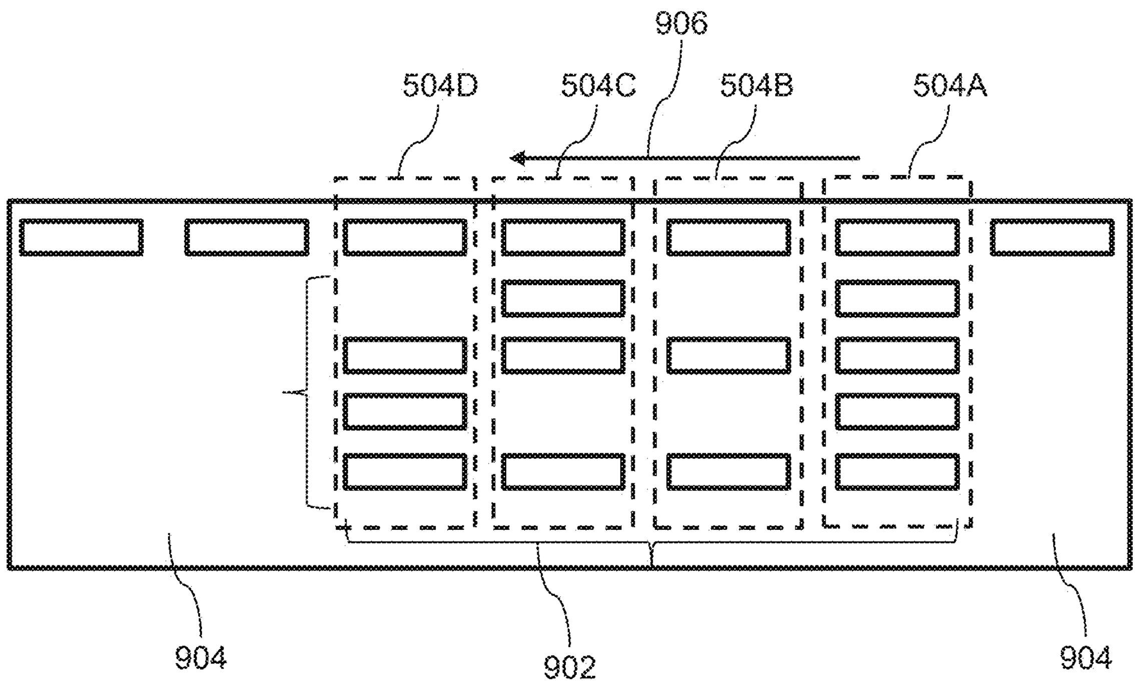
FIG. 9 is a side view of the rail path showing a marker zone and a plain zone as well as a direction of movement of the plurality of autonomous robots, such as those shown in FIG. 7, in accordance with an embodiment of the present disclosure.

FIG. 9 is a side view of the rail path 102 showing a marker zone 902 and a plain zone 904 as well as a direction of movement 906 of the plurality of autonomous robots 104, such as those shown in FIG. 7, in accordance with an embodiment of the present disclosure. In an embodiment, the autonomous robot localization system 100 is designed in a way that each of the plurality of rails 108 include the plurality of markers 210 that include one-way traffic of the plurality of autonomous robots 104. For example, FIG. 9 shows that the plurality of autonomous robots 104 come from right side towards left side. The sensor array 602 arranged inside the plurality of autonomous robots 104 scans a first marker bit array 504A so that the resistance values of plurality of sensors go down to generate a marker bits array pattern with a value of 0000).

The sensor array 602 further scans a second marker bit array 504B so that the resistance values of plurality of sensors are changed to generate a marker bits array pattern with a value of 1010. Further, the sensor array 602 scans a third marker bit array 504C so that the resistance values of plurality of sensors are changed to generate a marker bits array pattern with a value of 0010. The sensor array 602 scans a fourth marker bit array 504D so that the resistance values of plurality of sensors are changed to generate a marker bits array pattern with a value of 1000. In an embodiment, the marker zone 902 includes the plurality of marker bit array 504A-D. In another embodiment, the plain zone 904 that is shown in either sides of the marker zone 902, and the plain zone 904 includes only the reference slots.

Figure 10:
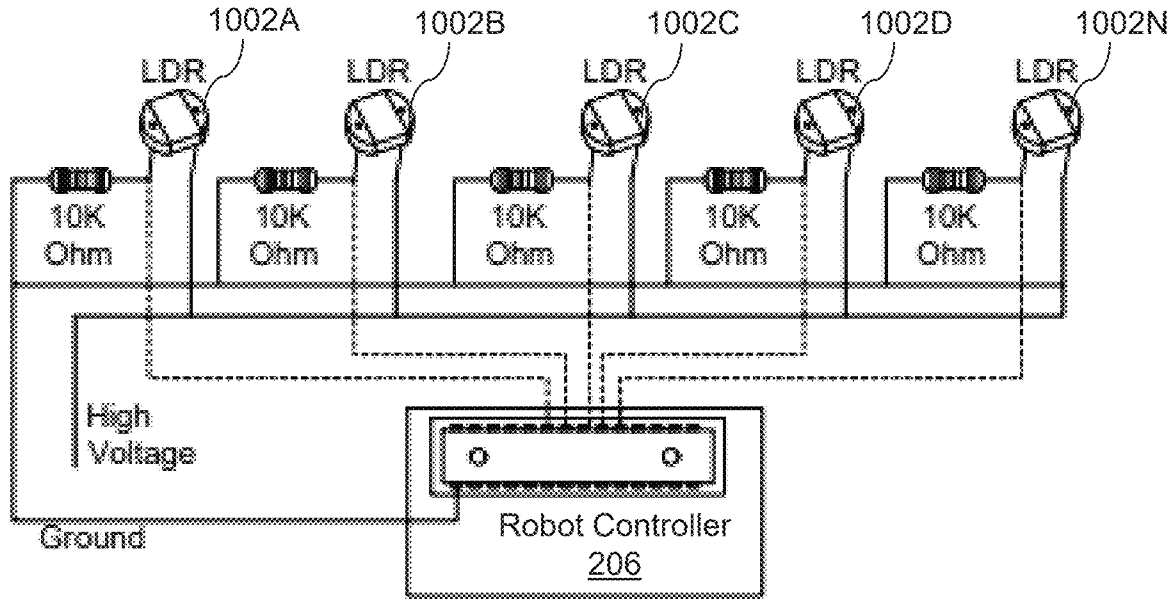
FIG. 10 is a schematic representation of an arrangement of light dependent resistors (LDRs) with a robot controller, in accordance with an embodiment of the present disclosure.

FIG. 10 is a schematic representation of an arrangement of a plurality of light dependent resistors (LDRs) 1002A-N with the robot controller 206, in accordance with an embodiment of the present disclosure. The plurality of LDRs 1002A-N (i.e., the plurality of sensors 204) are directly connected to a plurality of pins of the robot controller 206, which reads at least one of: the voltage and current values as a result of change of resistance. The plurality of LDRs 1002A-N send at least one of: the voltage values and current values upon scanning each of the plurality of marker bits 502. The robot controller 206 determines the difference between at least one of: the voltage values and the current values as a result of change of light intensity due to opacity pattern of the plurality of markers 210. The robot controller 206 further assigns the presence and absence status as 0 and 1 for each of the plurality of marker bits 502 based on the at least one of: voltage difference and current difference of the plurality of LDRs 1002A-N.

In an embodiment, the plurality of LDRs 1002A-N include resistance values that are changed based on the light intensity dependent on at least of: the presence 802 and absence 804 of each of the plurality of opaque marker bits. In another embodiment, the resistance values are determined based on the difference between at least one of: the voltage values and the current values of the plurality of LDRs 1002A-N (i.e., the plurality of sensors 204).

In an embodiment, the difference between at least one of: the voltage values and the current values is determined as the result of at least one of: a capacitance pattern, a, inductance pattern, a magnetic field pattern, and an electric field pattern of the plurality of markers 210. The robot controller 206 further stores at least one of: the voltage values and the current values of all the plurality of marker bit array 504A-D and combines the values to generate the plurality of location IDs. The stored plurality of location IDs are mapped with the generated plurality of marker patterns to determine the current position of the plurality of autonomous robots 104.

In an embodiment, the plurality of sensors 204 are bare sensors that refers to crude sensors that include the LDR 1002, an Infrared (IR) sensor, and a Hall sensor. The plurality of sensors 204 produce readable differences upon scanning relevant stimuli. For example, the resistance values of the LDRs 1002A-N is changed based on a change of light intensity. In another example, potential differences of the IR sensor are changed based on when IR rays falls on the IR sensor versus when there is no IR rays. In yet another example, potential differences of the Hall sensor are changed when the Hall sensor faces the north pole of magnet versus the Hall sensor faces the south pole of the magnet.

Figure 11:
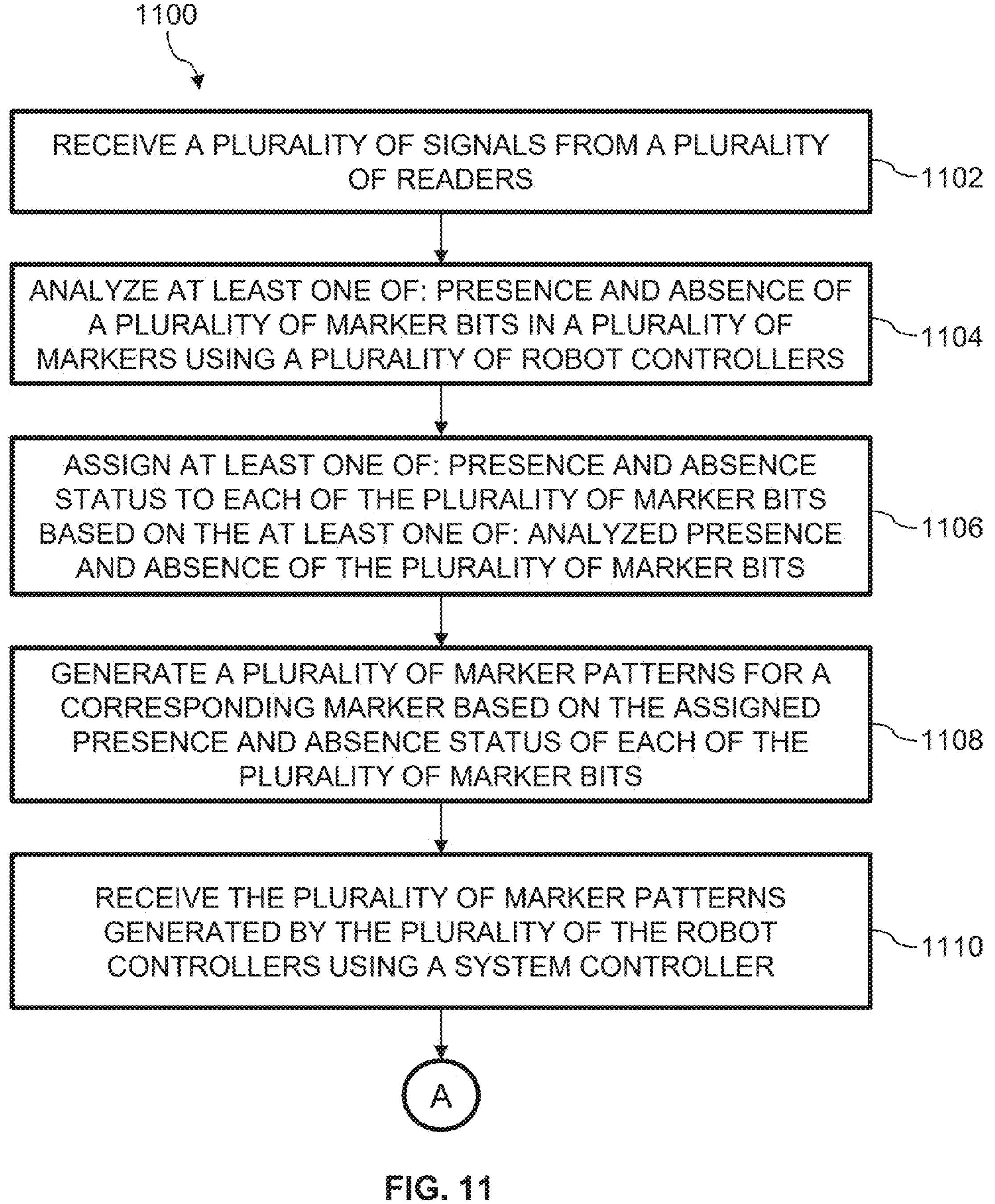
FIG. 11 is a flowchart illustrating a computer implemented method for managing the plurality of autonomous robots using the autonomous robot localization system, such as those shown in FIG. 2, in accordance with an embodiment of the present disclosure.
Figure 11:
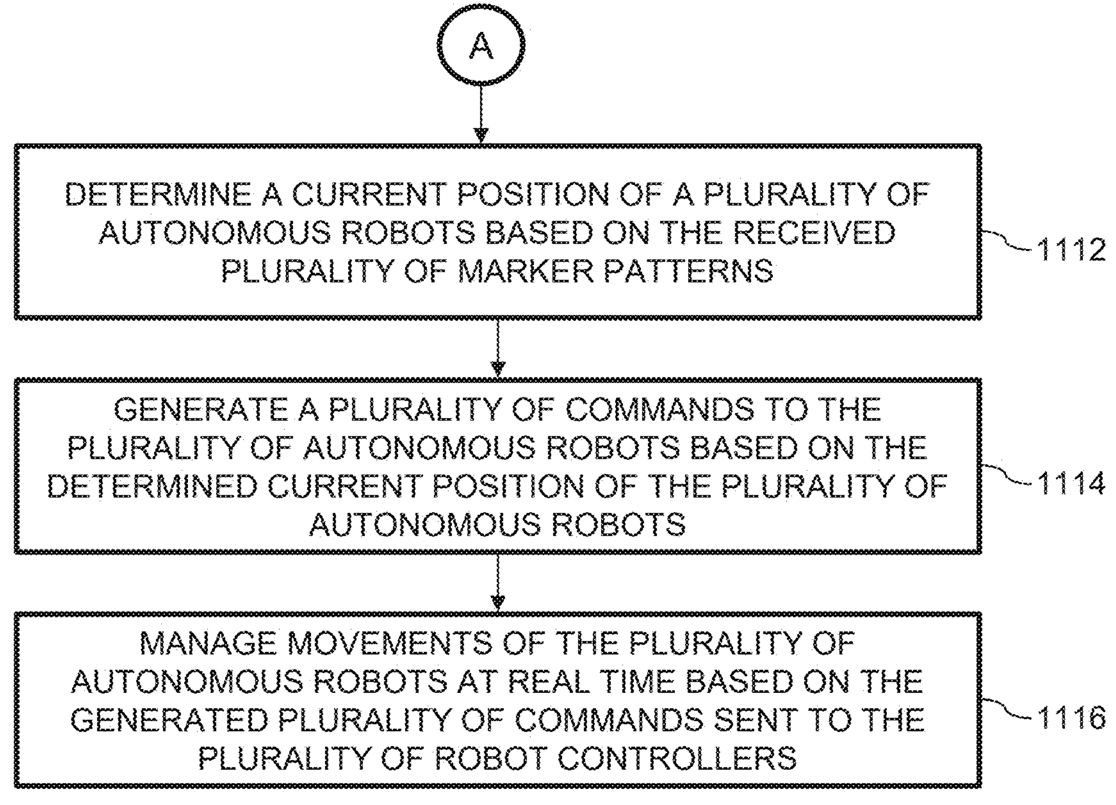

FIG. 11 is a flowchart illustrating a computer implemented method 1100 for managing the plurality of autonomous robots 104 using the autonomous robot localization system 100, such as those shown in FIG. 2, in accordance with an embodiment of the present disclosure. At step 1102, the plurality of robot controllers 206 receive a plurality of signals from a plurality of readers 202. The plurality of readers 202 include the plurality of sensors 204 that detect at least one of: the presence 802 and absence 804 of the plurality of marker bits 502 of the plurality of markers 210. In an embodiment, the plurality of signals are generated by the plurality of sensors 204 while passing through the plurality of marker bits 502.

At step 1104, the plurality of robot controllers 206 analyze at least one of: the presence 802 and absence 804 of the plurality of marker bits 502 in the plurality of markers 210. At step 1106, the plurality of robot controllers 206 assign at least one of: the presence and absence status to each of the plurality of marker bits 502 based on the at least one of: analyzed presence 802 and absence 804 of the plurality of marker bits 502. At step 1108, the plurality of robot controllers 206 generate the plurality of marker patterns for the corresponding marker 210 based on the assigned presence and absence status of each of the plurality of marker bits 502. At step 1110, the system controller 208 receives the plurality of marker patterns generated by the plurality of the robot controllers 206.

At step 1112, the system controller 208 determines the current position of the plurality of autonomous robots 104 based on the received plurality of marker patterns. The current position of the plurality of autonomous robots 104 are determined by mapping the generated plurality of marker patterns with the corresponding plurality of location identifiers (ID) pre-stored in a database. At step 1114, the system controller 208 generates the plurality of commands to the plurality of autonomous robots 104 based on the determined current position of the plurality of autonomous robots 104. At step 1116, the system controller 208 manages movements of the plurality of autonomous robots 104 at real time based on the generated plurality of commands sent to the plurality of robot controllers 206.

The present disclose provides the autonomous robot localization system 100 that utilizes the plurality of sensors 204, which are faster and cost effective. The autonomous robot localization system 100 can reliably handle above 65,536 ($2^{16}$) location IDs which are enough for autonomous robot localization applications. The autonomous robot localization system 100 is fast and a reliable reader-marker system for low-data size built using the plurality of sensors 204. Further, the plurality of markers 210 are adapted in a way that the length of the plurality of marker bits 502 can be easily increased to compensate for increased speed of the plurality of autonomous robots 104. Further, the plurality of sensors 204 in the autonomous robot localization system 100 accurately work at much higher speeds than the other sensor modules. Further, total number of the plurality of sensors 204 required for reading the plurality of markers 210 are significantly lesser than other reader-marker systems, which results in lesser material cost as well as controller's computational cost.

The autonomous robot localization system 100 controls the traffic among the plurality of autonomous robots 104 by sending the plurality of commands to the plurality of autonomous robots 104 using the system controller 208. The system controller 208 of the plurality of autonomous robots 104 determines the accurate current position of the plurality of autonomous robots 104 and manages the plurality of autonomous robots 104 by sending the commands to continue moving or stop the plurality of autonomous robots 104 in order to avoid collision among the plurality of autonomous robots 104. Further, the system controller 208 manages the plurality of autonomous robots 104 based on the plurality of traffic conditions of the plurality of rail paths 102.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, and the like.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. An autonomous robot localization system (100) for managing a plurality of autonomous robots (104) in an industrial setup, the autonomous robot localization system (100) comprising:

a plurality of rail paths (102) for guiding the plurality of autonomous robots (104) on the plurality of rail paths (102), wherein the plurality of rail paths (102) comprise a plurality of markers (210) for identifying a current position of the plurality of autonomous robots (104), and wherein the plurality of markers (210) comprise a plurality of marker bits (502) that are arranged in a plurality of patterns;

the plurality of autonomous robots (104) carrying a plurality of articles, wherein the plurality of autonomous robots (104) comprise of a plurality of readers (202) for communicatively connected to the plurality of markers (210) on the plurality of rail paths (102), and wherein the plurality of readers (202) comprise a plurality of sensors (204) configured to detect at least one of: presence (802) and absence (804) of the plurality of marker bits (502); and wherein the plurality of autonomous robots (104) comprise a plurality of robot controllers (206) that is communicatively connected to the plurality of readers (202), wherein the plurality of autonomous robots (104) are configured to:

receive, using the plurality of readers (202), a plurality of signals, wherein the plurality of signals are generated by the plurality of sensors (204) while passing through the plurality of marker bits (502), wherein the plurality of sensors (204) in a sensor array (602) are proportional to the maximum number of plurality of marker bits (502) in a plurality of marker bits array (504) of plurality of markers (210);

analyze, using the plurality of robot controllers (206), at least one of: the presence (802) and absence (804) of the plurality of marker bits (502) in the plurality of markers (210);

assign, using the plurality of robot controllers (206), at least one of: a presence and absence status to each of the plurality of marker bits (502) based on the at least one of: analyzed presence (802) and absence (804) of the plurality of marker bits (502); and generate, using the plurality of robot controllers (206), a plurality of marker patterns for the corresponding marker (210) based on the assigned presence and absence status of each of the plurality of marker bits (502); and a system controller (208) configured to control the plurality of autonomous robots (104), wherein the system controller (208) is configured to:

receive the plurality of marker patterns generated by the plurality of the robot controllers (206);

determine the current position of the plurality of autonomous robots (104) based on the received plurality of marker patterns, wherein the current position of the plurality of autonomous robots (104)

are determined by mapping, the generated plurality of marker patterns with a corresponding plurality of location identifiers (ID) pre-stored in a database;

generate a plurality of commands to the plurality of autonomous robots (104) based on the determined current position of the plurality of autonomous robots (104); and manage movements of the plurality of autonomous robots (104) at real time based on the generated plurality of commands sent to the plurality of robot controllers (206).

2. The autonomous robot localization system (100) as claimed in claim 1, wherein the plurality of robot controllers (206) are configured to assign at least one of: the presence and absence status to the plurality of marker bits (502) by:

obtaining, using the plurality of robot controllers (206), at least one of: voltage values and current values from the plurality of sensors (204) upon scanning each of the plurality of marker bits (502);

determining, using the plurality of robot controllers (206), a difference between at least one of: the voltage values and the current values as a result of change of light intensity due to opacity pattern of the plurality of markers (210); and assigning, using the plurality of robot controllers (206), at least one of: the presence and absence status for each of the plurality of marker bits (502) based on the at least one of: voltage difference and current difference of the plurality of sensors (204).

3. The autonomous robot localization system (100) as claimed in claim 2, wherein the plurality of sensors (204) comprise resistance values that are changed based on the light intensity dependent on at least of: the presence (802) and absence (804) of each of the plurality of opaque marker bits, and wherein the resistance values are determined based on the difference between at least one of: the voltage values and the current values of the plurality of sensors (204).

4. The autonomous robot localization system (100) as claimed in claim 1, wherein the system controller (208) manages the movements of the plurality of autonomous robots (104) by:

identifying a current position of the plurality of autonomous robots (104) based on the location ID;

determining a traffic among the plurality of autonomous robots (104) in the plurality of rail paths (102); and managing the movements of the plurality of autonomous robots (104) based on a determined traffic in the plurality of rail paths (102).

5. The autonomous robot localization system (100) as claimed in claim 1, wherein the plurality of sensors (204) comprise at least one of: light dependent resistors (LDR) (1002), capacitive sensors, inductive sensors, a hall sensor and a reed switch, that are connected to the plurality of robot controllers (206) of the plurality of autonomous robots (104), and wherein the plurality of sensors (204) are built using an array of at least two sensors.

6. The autonomous robot localization system (100) as claimed in claim 1, wherein the plurality of marker bits (502) comprise light sources and opaque material with a plurality of slots in the plurality of rail paths (102), wherein the plurality of marker bits (502) are arranged as the plurality of slots in the plurality of rail paths (102).

7. The autonomous robot localization system (100) as claimed in claim 5, wherein the plurality of marker bits (502) are arranged as a plurality of magnets in the plurality of rail paths (102) when the plurality of sensors (204) are at least one of: the hall sensor and the reed switch.

8. The autonomous robot localization system (100) as claimed in claim 1, wherein the plurality of robot controllers (206) and the plurality of readers (202) comprising the plurality of sensors (204) are arranged within the plurality of autonomous robots (104).

9. The autonomous robot localization system (100) as claimed in claim 1, wherein the plurality of markers (210) are grouped as M×N array (702) of the plurality of marker bits (502) in each of the plurality of markers (210), wherein M is a row (704) of the plurality of marker bits (502) and N is a column (706) of the plurality of marker bits (502), wherein each row (704) comprises M number of position for the plurality of marker bits (502) and each column (706) comprises N number of positions for the plurality of marker bits (502), together comprising M*N numbers of a plurality of marker-bits positions, and wherein each position indicate the at least one of: the presence (802) and absence (804) of a marker bit (502).

10. The autonomous robot localization system (100) as claimed in claim 1, wherein the plurality of sensors (204) are arranged within the plurality of autonomous robots (104) in a position that the plurality of sensors (204) appear in front of the plurality of marker bits (502) to scan the plurality of marker bits (502) when the plurality of sensors (204) pass through the plurality of markers (210).

11. The autonomous robot localization system (100) as claimed in claim 10, wherein the plurality of sensors (204) scan the plurality of markers (210) in an exposure time duration, and wherein the exposure time duration of the plurality of sensors (204) is directly proportional to a length of the plurality of marker bits (502), and inverse of a processing power of the plurality of robot controllers (206).

12. The autonomous robot localization system (100) as claimed in claim 2, wherein the plurality of robot controllers (206) differentiates the plurality of marker bits (502) with a binary value of 0 based on the plurality of slots in a bright portion (802) when the bright portion (802) comprising a light source without opaque portion is analyzed in the plurality of marker bits (502), and wherein the plurality of robot controllers (206) differentiates the plurality of marker bits (502) with a binary value of 1 based on blocking of the plurality of slots in a dark portion (804) when the dark portion (804) comprising a light source with opaque portion is analyzed in the plurality of marker bits (502).

13. The autonomous robot localization system (100) as claimed in claim 2, wherein the difference between at least one of: the voltage values and the current values is determined as the result of at least one of: a capacitance pattern of the plurality of markers (210), a, inductance pattern of the plurality of markers (210), a magnetic field pattern of the plurality of markers (210), and an electric field pattern of the plurality of markers (210).

14. The autonomous robot localization system (100) as claimed in claim 1, wherein the plurality of markers (210) bits are formed by at least one of: a material property comprising opacity, conductivity, capacitance, resistance, electric field, magnetic field.

15. An autonomous robot localization method (1100) for managing a plurality of autonomous robots (104) in an industrial setup using an autonomous robot localization system (100), the autonomous robot localization method (1100) comprising:

receiving (1102), using a plurality of robot controllers (206), a plurality of signals from a plurality of readers (202), wherein the plurality of readers (202) comprise a plurality of sensors (204) configured to detect at least one of: presence (802) and absence (804) of a plurality of marker bits (502) of a plurality of markers (210), wherein the plurality of signals are generated by the plurality of sensors (204) while passing through the plurality of marker bits (502), wherein the plurality of sensors (204) in a sensor array (602) are proportional to the maximum number of marker bits (502) in marker bits array (504) of plurality of markers (210);

analyzing (1104), using the plurality of robot controllers (206), at least one of: the presence (802) and absence (804) of the plurality of marker bits (502) in the plurality of markers (210);

assigning (1106), using the plurality of robot controllers (206), at least one of: a presence and absence status to each of the plurality of marker bits (502) based on the at least one of: analyzed presence (802) and absence (804) of the plurality of marker bits (502); and generating (1108), using the plurality of robot controllers (206), a plurality of marker patterns for the corresponding marker (210) based on the assigned presence and absence status of each of the plurality of marker bits (502);

receiving (1110), using a system controller (208), the plurality of marker patterns generated by the plurality of the robot controllers (206);

determining (1112), using the system controller (208), a current position of the plurality of autonomous robots (104) based on the received plurality of marker patterns, wherein the current position of the plurality of autonomous robots (104) are determined by mapping, the generated plurality of marker patterns with a corresponding plurality of location identifiers (ID) prestored in a database;

generating (1114), using the system controller (208), a plurality of commands to the plurality of autonomous robots (104) based on the determined current position of the plurality of autonomous robots (104); and managing (1116), using the system controller (208), movements of the plurality of autonomous robots (104) at real time based on the generated plurality of commands sent to the plurality of robot controllers (206).

16. The autonomous robot localization method (1100) as claimed in claim 15, wherein assigning (1106) at least one of: the presence and absence status to the plurality of marker bits (502) comprising:

obtaining, using the plurality of robot controllers (206), at least one of: voltage values and current values from the plurality of sensors (204) upon scanning each of the plurality of marker bits (502);

determining, using the plurality of robot controllers (206), a difference between the at least one of: the voltage values and the current values as a result of change of light intensity due to opacity pattern of the plurality of markers (210); and assigning, using the plurality of robot controllers (206), at least one of: the presence and absence status for each of the plurality of marker bits (502) based on the at least one of: voltage difference and current difference of the plurality of sensors (204).

17. The autonomous robot localization method (1100) as claimed in claim 16, wherein the plurality of sensors (204) comprise resistance values that are changed based on the light intensity dependent on at least of: the presence (802) and absence (804) of each of the plurality of opaque marker bits (502), and wherein the resistance values are determined based on the difference between at least one of: the voltage values and the current values of the plurality of sensors (204).

18. The autonomous robot localization method (1100) as claimed in claim 15, wherein managing (1116) the movements of the plurality of autonomous robots (104) comprising:

identifying, using the system controller (208), a current position of the plurality of autonomous robots (104) based on the location ID;

determining, using the system controller (208), a traffic among the plurality of autonomous robots (104) in a plurality of rail paths (102); and managing, using the system controller (208), the movements of the plurality of autonomous robots (104) based on a determined traffic in the plurality of rail paths (102).

19. The autonomous robot localization method (1100) as claimed in claim 15, wherein the plurality of markers (210) are grouped as M×N array (702) of the plurality of marker bits (502) in each of the plurality of markers (210), wherein M is a row (704) of the plurality of marker bits (502) and N is a column (706) of the plurality of marker bits (502), wherein each row (704) comprises M number of position for the plurality of marker bits (502) and each column (706) comprises N number of positions for the plurality of marker bits (502), together comprising M*N numbers of a plurality of marker-bits positions, and wherein each position indicate the at least one of: the presence (802) and absence (804) of a marker bit (502).

20. The autonomous robot localization method (1100) as claimed in claim 15, wherein the plurality of sensors (204) are arranged within the plurality of autonomous robots (104) in a position that the plurality of sensors (204) appear in front of the plurality of marker bits (502) to scan the plurality of marker bits (502) when the plurality of sensors (204) pass through the plurality of markers (210).

21. The autonomous robot localization method (1100) as claimed in claim 20, wherein the plurality of sensors (204) scan the plurality of markers (210) in an exposure time duration, and wherein the exposure time duration of the plurality of sensors (204) is directly proportional to a length of the plurality of marker bits (502), and inverse of a processing power of the plurality of robot controllers (206).

22. The autonomous robot localization method (1100) as claimed in claim 15, wherein the plurality of robot controllers (206) differentiates the plurality of marker bits (502) with a binary value of 0 based on the plurality of slots in a bright portion (802) when the bright portion (802) comprising a light source without opaque portion is analyzed in the plurality of marker bits (502), and wherein the plurality of robot controllers (206) differentiates the plurality of marker bits (502) with a binary value of 1 based on blocking of the plurality of slots in a dark portion (804) when the dark portion (804) comprising a light source with opaque portion is analyzed in the plurality of marker bits (502).

23. The autonomous robot localization method (1100) as claimed in claim 15, wherein the difference between the at least one of: the voltage values and the current values is determined as the result of at least one of: a capacitance pattern of the plurality of markers (210), a, inductance pattern of the plurality of markers (210), a magnetic field pattern of the plurality of markers (210), and an electric field pattern of the plurality of markers (210).

* * * * *